United States Patent
Iwashita et al.

(10) Patent No.: US 9,041,243 B2
(45) Date of Patent: May 26, 2015

(54) POWER CONTROL APPARATUS

(71) Applicant: HONDA MOTOR CO., LTD., Minato-ku, Tokyo (JP)

(72) Inventors: Hideaki Iwashita, Wako (JP); Kenji Oogushi, Wako (JP); Masaya Deguchi, Wako (JP); Eisuke Komazawa, Wako (JP); Masatoshi Nakajima, Wako (JP); Naoto Doi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/985,252

(22) PCT Filed: Nov. 12, 2012

(86) PCT No.: PCT/JP2012/079240
§ 371 (c)(1),
(2) Date: Aug. 13, 2013

(87) PCT Pub. No.: WO2013/084665
PCT Pub. Date: Jun. 13, 2013

(65) Prior Publication Data
US 2014/0300180 A1  Oct. 9, 2014

(30) Foreign Application Priority Data
Dec. 9, 2011  (JP) .................... 2011-270002

(51) Int. Cl.
*B60L 1/00*  (2006.01)
*B60L 3/04*  (2006.01)
(Continued)

(52) U.S. Cl.
CPC ... *B60L 3/04* (2013.01); *B60L 3/00* (2013.01); *H01M 10/42* (2013.01); *H01M 10/48* (2013.01);
(Continued)

(58) Field of Classification Search
USPC ........................................................ 307/10.1
See application file for complete search history.

(56) References Cited

U.S. PATENT DOCUMENTS

2010/0127663 A1    5/2010  Furukawa et al.
2012/0169117 A1*   7/2012  Park .......................... 307/10.7
(Continued)

FOREIGN PATENT DOCUMENTS

CN     102104176 A      6/2011
JP     A-2002-142353    5/2002
(Continued)

OTHER PUBLICATIONS

Chinese Office Action, Chinese Patent Applicaiton No. 201280008800.7 dated Jan. 6, 2014.
International Search Report; PCT/JP2012/079240 dated Dec. 18, 2012.

*Primary Examiner* — Daniel Cavallari
(74) *Attorney, Agent, or Firm* — Westerman, Hattori, Daniels & Adrian, LLP

(57) ABSTRACT

A power control apparatus is mounted on an electrically driven vehicle which includes an electrical storage device configured by connecting a plurality of batteries in parallel, a voltage detection unit which detects a voltage of each battery, and a load, and the power control apparatus includes, a voltage deviation calculation unit which is connected to the electrical storage device, and calculates voltage deviation between the plurality of batteries based on the voltage detected by each voltage detection unit at the time of driving the load which is driven by power supply from the electrical storage device, a comparator which compares the voltage deviation calculated by the voltage deviation calculation unit and a first predetermined threshold, and a cutoff detection unit which detects a presence or absence of the battery, which comes into a cutoff state in the electrical storage device, when the voltage deviation is equal to or more than the first threshold in a comparison result by the comparator.

8 Claims, 4 Drawing Sheets

(51) Int. Cl.
*B60L 3/00* (2006.01)
*H01M 10/42* (2006.01)
*H01M 10/48* (2006.01)
*B60L 11/18* (2006.01)
*H02J 7/00* (2006.01)

(52) U.S. Cl.
CPC ........... *B60L 3/0046* (2013.01); *B60L 11/1864* (2013.01); *B60L 11/1868* (2013.01); *H02J 7/0021* (2013.01); *H02J 7/0031* (2013.01); *Y02T 10/7005* (2013.01); *Y02T 10/7066* (2013.01); *Y02T 10/7061* (2013.01); *Y02T 10/7055* (2013.01); *B60L 11/1855* (2013.01)

(56) References Cited

U.S. PATENT DOCUMENTS

| | | | |
|---|---|---|---|
| 2012/0235483 A1* | 9/2012 | Rigby et al. | 307/29 |
| 2013/0099596 A1* | 4/2013 | Ichikawa et al. | 307/115 |
| 2013/0127243 A1* | 5/2013 | Berg et al. | 307/9.1 |

FOREIGN PATENT DOCUMENTS

| | | |
|---|---|---|
| JP | 2010-130768 A | 6/2010 |
| JP | 2010-183679 A | 8/2010 |
| JP | 4560825 B1 | 8/2010 |
| JP | 2010-233290 A | 10/2010 |

* cited by examiner

POWER CONTROL APPARATUS

CROSS-REFERENCE TO RELATED APPLICATIONS

This application is a National Stage entry of International Application PCT/JP2012/079240 filed Nov. 12, 2012, which claims priority of Japanese Patent Application No. 2011-270002, filed Dec. 9, 2011, the disclosure of these prior applications are hereby incorporated in their entirety by reference.

TECHNICAL FIELD OF THE INVENTION

The present invention relates to a power control apparatus.

BACKGROUND ART

In the related art, for example, a battery pack that is configured by connecting a plurality of single cell groups in parallel is known. The single cell group is configured by connecting a plurality of single cells in series. In addition, a fuse is provided in each single cell group, and when an abnormality such as internal short-circuit occurs in a single cell, by melting and cutting the fuse of the single cell group including the single cell in which the abnormality has occurred, only the single cell group in the abnormal state is opened and connection of the to a load is cut off (refer to Patent Document 1).

PRIOR ART DOCUMENTS

Patent Documents

Patent Document 1: Japanese Patent No. 4560825

SUMMARY OF THE INVENTION

Problems to be Solved by the Invention

However, in the battery pack of the related art, in a case where each main contactor is connected between each single cell group and the load, and each precharge resistor connected to each single cell group is connected to a single precharge contactor in order to eliminate variation of voltage of each single cell group, a voltage difference between single cell groups will excessively increase when a stuck open of any one of main contactor, a disconnection of any one of a single cell group, or the like occurs.

In this case, for example, immediately after the main contactor becomes stuck open, excessive current flows between the single cell groups via the precharge resistors, the precharge resistor or the fuse provided in the single cell group is overheated to cause an abnormality, and thus, there is a concern that a vehicle may suddenly not run. Moreover, for example, when the disconnection of the single cell group occurs, excessive current flows between the single cell groups via the precharge resistors in a case where the disconnection is cancelled, the precharge resistor or the fuse provided in the single cell group is overheated to cause an abnormality, and thus, there is a concern that a vehicle may suddenly not run.

The aspect of the present invention is made in consideration of the above-described problems, and an object thereof is to provide a power control apparatus which prevents overheating of a power supply line and is capable of preventing a vehicle from suddenly being unable to run.

Means for Solving the Problems

In order to solve the above-described problems and achieve the object, the present invention adopts the following.

(1) According to an aspect of the present invention, a power control apparatus is provided that is mounted on an electrically driven vehicle which includes an electrical storage device configured by connecting a plurality of batteries in parallel, a voltage detection unit which detects a voltage of each battery, and a load, the power control apparatus including: a voltage deviation calculation unit that is connected to the electrical storage device, and calculates a voltage deviation between the plurality of batteries based on a voltage detected by the each voltage detection unit at a time of driving the load which is driven by power supplied from the electrical storage device; a comparator that compares the voltage deviation calculated by the voltage deviation calculation unit and a first predetermined threshold; and a cutoff detection unit that detects a presence or an absence of the battery, which comes into a cutoff state in the electrical storage device, when the voltage deviation is equal to or more than the first threshold in a comparison result by the comparator.

(2) The power control apparatus according to the aspect of (1) may further include: a notification unit that notifies a driver of the electrically driven vehicle that the electrical storage device is in an abnormal state when the presence of the battery, which comes into the cutoff state, is detected by the cutoff detection unit.

(3) The power control apparatus according to the aspect of (1) or (2) may further include: a drive stop unit that stops the driving of the load when the voltage deviation is equal to or more than a second threshold as a comparison result obtained by using the comparator by comparing the voltage deviation calculated by the voltage deviation calculation unit and the second threshold which is larger than the first threshold.

(4) In the power control apparatus according to any one of the aspects of (1) to (3), the first threshold may be a sum of a maximum voltage difference, which is generated when each battery is self-discharged in a state of being cut off from the load, and a detection error of the voltage detection unit.

(5) In the power control apparatus according to any one of the aspects of (1) to (4), the electrical storage device mounted on the electrically driven vehicle may be connected to at least a capacitor and an inverter which controls an electric motor, and may include a switch, that is capable of connecting and cutting off each battery and the capacitor and that supplies electric charges to the capacitor by connecting each battery and the capacitor at a time of starting of the electric motor, and each of resistors that is connected in series between the switch and each battery. In addition, the second threshold may be set to a smaller value with a decrease of a resistance value of each resistor or a decrease of a current value which is allowed for each of the resistors.

Effect of the Invention

According to the power control apparatus of (1) of the present invention, when the voltage deviation between the plurality of batteries is equal to or more than the first predetermined threshold, detecting the presence or absence of the battery which comes into the cutoff state in the electrical storage device makes it possible to prevent the voltage deviation from suddenly becoming larger than the first predetermined threshold, and is capable of early detecting a (for example, before the voltage deviation is excessively increased and the electrically driven vehicle cannot be run) presence or absence of the battery which has come into the cutoff state.

According to the power control apparatus of (2) of the present invention, notifying the driver of the abnormality of the electrical storage device makes it possible for the driver to prevent an occurrence of unexpected overheating in the electrical storage device. Thereby, it is possible to prevent the electrically driven vehicle from suddenly being unable to run.

According to the power control apparatus of (3) of the present invention, when the voltage deviation between the plurality of batteries is equal to or more than the second predetermined threshold, the driver can prevent unexpected and sudden stop of the load by stopping the driving of the load.

According to the power control apparatus of (4) of the present invention, the voltage deviation due to self-discharge of each battery and the voltage deviation due to the abnormality of the electrical storage device can be appropriately distinguished from each other.

According to the power control apparatus of (5) of the present invention, it is possible to prevent excessive current from flowing to each resistor which is connected in series to each battery, and to prevent being an overheated state. Thereby, it is possible to prevent the electrically driven vehicle from suddenly being unable to run.

DESCRIPTION OF EMBODIMENTS

Hereinafter, a power control apparatus according to an embodiment of the present invention will be described with reference to the accompanying drawings.

Figure 1:
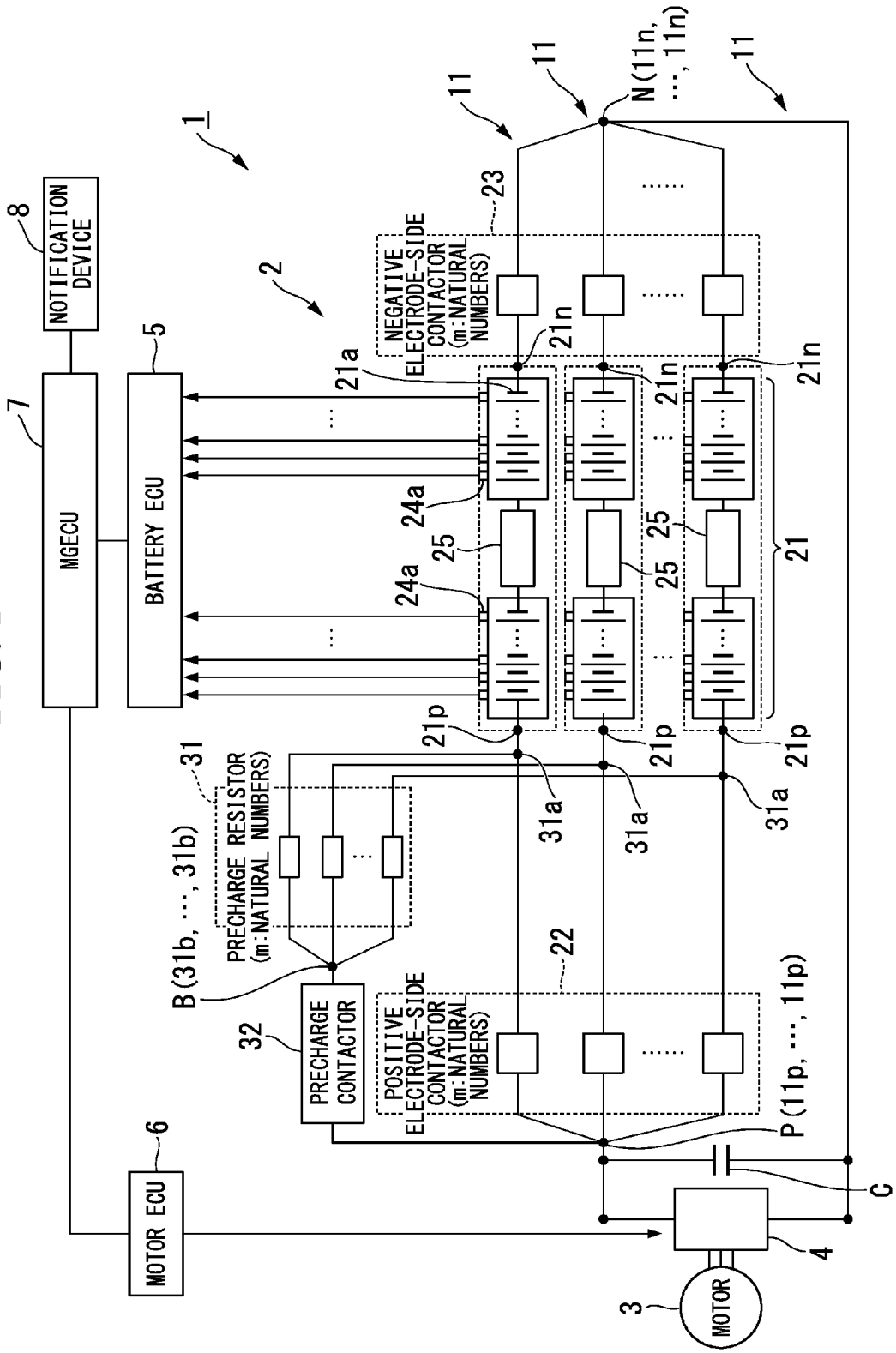
FIG. 1 is a configuration view of a power control apparatus according to an embodiment of the present invention.

For example, a power control apparatus 1 according to the present embodiment is mounted on an electrically driven vehicle, and as shown in FIG. 1, is configured to include an inverter 4 which controls a three-phase (for example, three phases of U phase, V phase, and W phase) alternating-current brushless DC motor 3 (load, electric motor, and hereinafter, simply referred to as a motor 3) which outputs a driving force for driving a vehicle with an electrical storage device 2 as a direct current power supply, a battery ECU 5 (voltage detection unit, voltage deviation calculation unit, comparator, cutoff detection unit), a motor ECU 6 (drive stop unit), a MGECU 7 (notification unit, drive stop unit), and a notification device 8 (notification unit).

For example, the electrical storage device 2 is configured by connecting a plurality (m) of power supply units 11, ..., 11 (m is a natural number of 2 or more) in parallel. The electrical storage device 2 include a positive electrode-side connection portion P which is formed by connecting positive electrode-side terminals 11p of respective power supply units 11 which configure the m power supply units 11, ..., 11 and a negative electrode-side connection portion N which is formed by connecting negative electrode-side terminals 11n of respective power supply units 11 which configure the m power supply units 11, ..., 11.

That is, the positive electrode-side connection portion P and the negative electrode-side connection portion N of the electrical storage device 2 configure a positive electrode-side output terminal and a negative electrode-side output terminal which are connected to the inverter 4. The m power supply units 11, ..., 11 are connected in parallel to the positive electrode-side output terminal and the negative electrode-side output terminal.

In addition, for example, the inverter 4 includes a smoothing capacitor C which is connected in parallel between the positive electrode-side output terminal and the negative electrode-side output terminal.

For example, each power supply unit 11 is configured to include a battery unit 21 (battery) in which a plurality of battery cells 21a, ..., 21a are configured to be connected in series, a positive electrode-side contactor 22 which is connected in series to be electrically connected and disconnected between a positive electrode terminal 21p of the battery unit 21 and the positive electrode-side connection portion P, a negative electrode-side contactor 23 which is connected in series to be electrically connected and disconnected between a negative electrode terminal 21n of the battery unit 21 and the negative electrode-side connection portion N, and each voltage sensor 24a (voltage detection unit) which detects voltage of each battery cell 21a.

Moreover, for example, the battery unit 21 includes a cutoff mechanism 25, which is configured of a switch, a fuse, or the like capable of cutting off electric conduction, at an appropriate position of the plurality of battery cells 21a, ..., 21a connected in series.

For example, the cutoff mechanism 25 is capable of cutting off the electric conduction automatically or by operation of an operator when current equal to or more than a predetermined value flows. In addition, the cutoff of the electric conduction can be canceled by an operator who operates the cutoff mechanism 25.

For example, each power supply unit 11 includes a precharge resistor 31 (resistor) in which an end 31a is connected between the positive electrode terminal 21p of the battery unit 21 and the positive electrode-side contactor 22.

The electrical storage device 2 includes one precharge contactor 32 (switch) which is connected in series to be electrically connected and disconnected between a resistor connection portion B which is configured by connecting other ends 31b of each precharge resistor 31 of the m power supply units 11, ..., 11 and the positive electrode-side connection portion P.

For example, the power control apparatus 1 includes the battery ECU 5, the motor ECU 6, and the MGECU 7 as various ECUs (Electronic Control Unit) which are configured of an electronic circuit such as a CPU (Central Processing Unit).

In addition, for example, the precharge contactor 32 temporarily comes into a connection state when electric conduction starts from the electrical storage device 2 to the motor 3 at the time of starting of the electrically driven vehicle or the like, and comes into an open state after an appropriate time elapses from the starting of the electric conduction.

In addition, the positive electrode-side contactor 22 and the negative electrode-side contactor 23 come into connection states at the time of driving of the electrically driven vehicle.

That is, at the time of starting of the electrically driven vehicle, first, the battery ECU 5 causes the precharge contactor 32 and the negative electrode-side contactor 23 to come into connection states, causes the positive electrode-side contactor 22 to come into the open state, and precharges the smoothing capacitor C. In addition, after the precharge is completed, the battery ECU 5 switches the positive electrode-side contactor 22 from the open state to the connection state, maintains the negative electrode-side contactor 23 in the connection state, and switches the precharge contactor 32 from the connection state to the open state.

For example, at the time of driving of the motor 3, the battery ECU 5 integrates voltage of the plurality of battery cells 21a which is output from the plurality of voltage sensors 24a for each battery unit 21 based on signals of detected results of the voltage of each battery cell 21a which is output from each voltage sensor 24a, and the battery ECU 5 calculates the voltage of each battery unit 21.

Moreover, the battery ECU 5 calculates voltage deviation between any pair of the plurality of battery units 21 which have a relationship of parallel connection with respect to the motor 3, and compares the calculated voltage deviation and a first predetermined threshold.

Moreover, when the voltage deviation between battery units 21 is equal to or more than the first threshold, the battery ECU 5 detects the presence or absence of the battery unit 21 which comes into a cutoff state by the cutoff mechanism 25 among the plurality of battery units 21.

In addition, the battery ECU 5 outputs signals of the detected results to the MGECU 7.

According to this, when the signals are input to the MGECU 7, which indicates that presence of the battery unit 21, which comes into the cutoff state by the cutoff mechanism 25 among the plurality of battery units 21, is detected by the battery ECU 5, the MGECU 7 controls the notification device 8 and notifies a driver of the electrically driven vehicle that the battery unit 21 is in an abnormal state.

Moreover, for example, the first predetermined threshold is a sum of a maximum voltage difference which is generated when each battery unit 21 is self-discharged in a state of being cut off from a load (that is, motor 3) and a detection error of the voltage sensor 24a.

In addition, for example, at the time of driving of the motor 3, the battery ECU 5 calculates the voltage deviation between the plurality of battery units 21 having a relationship of a parallel connection with respect to the motor 3 based on signals of the detected results of the voltage of each battery cell 21a which is output from each voltage sensor 24a, and compares the calculated voltage deviation and a second predetermined threshold which is larger than the first predetermined threshold. Then, signals of comparison results as to whether or not the voltage deviation between any pair of the battery units 21 is equal to or more than the second threshold are output to the MGECU 7.

In addition, for example, the second predetermined threshold is a value corresponding to a resistance value of the precharge resistor 31 or a current value which is allowed for the precharge resistor 31. The second threshold is set to a smaller value with a decrease in the resistance value of the precharge resistor 31 or a decrease in the current value which is allowed for the precharge resistor 31.

The motor ECU 6 outputs instructions with respect to a power converting operation of the inverter 4 and controls the operation (electric conduction) of the motor 3 via the inverter 4.

The MGECU 7 performs management and control of the battery ECU 5 and the motor ECU 6, and controls the operation state of the motor 3 and the state of the electrically driven vehicle in cooperation with the battery ECU 5 and the motor ECU 6.

For example, when the presence of the battery unit 21, which comes into the cutoff state by the cutoff mechanism 25 among the plurality of battery units 21, is detected by the battery ECU 5, the MGECU 7 controls the notification device 8 to notify the driver of the electrically driven vehicle that the battery unit 21 is in an abnormal state.

Moreover, for example, when the battery ECU 5 detects that the voltage deviation between the pluralities of battery units 21 is equal to or more than the second threshold, the MGECU 7 stops the driving of the motor 3 by the motor ECU 6.

The power control apparatus 1 according to the present embodiment includes the above-described configuration, and next, an operation of the power control apparatus 1 will be described.

Figure 2:
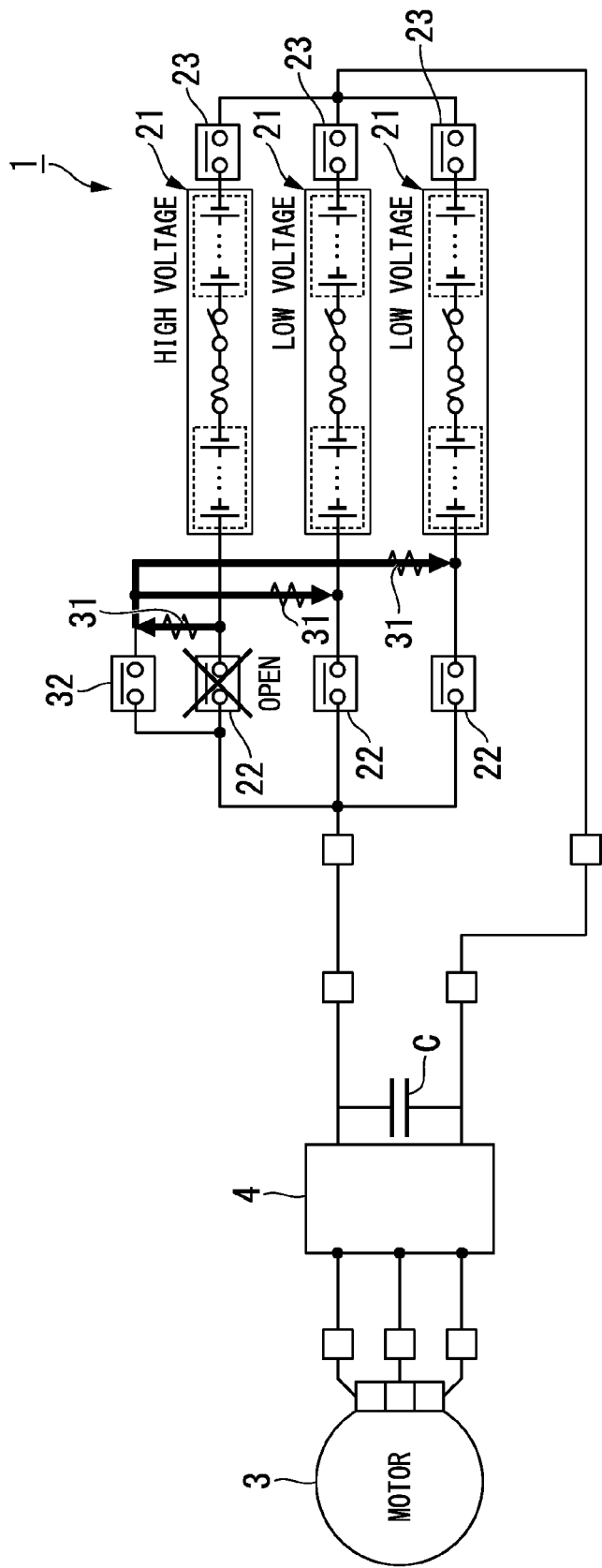
FIG. 2 is a view showing a state where an abnormality (stuck open), in which a positive electrode-side contactor is fixed in an open state, occurs in any one of battery units of the power control apparatus according to the embodiment of the present invention.
Figure 3:
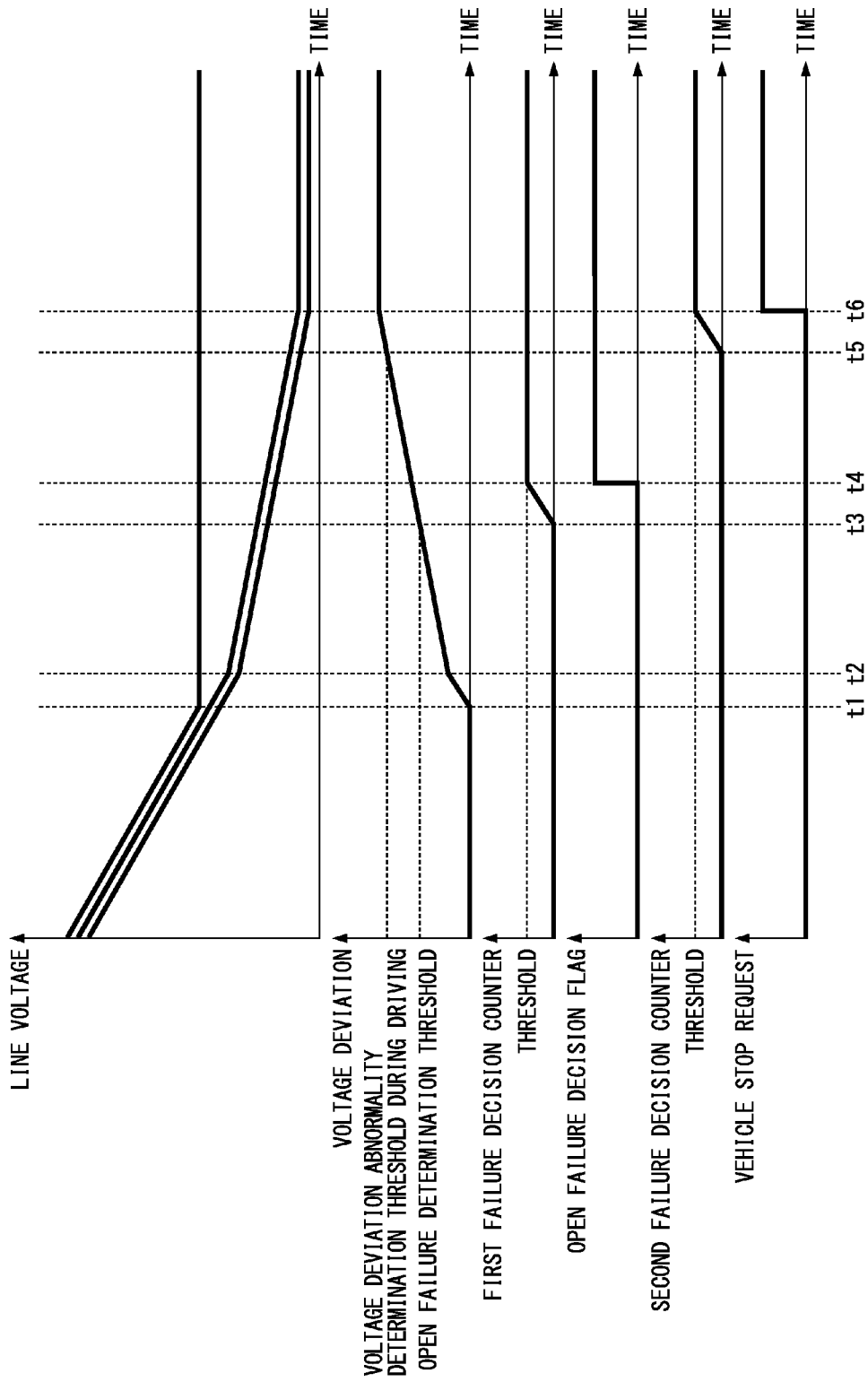
FIG. 3 is a view showing an example of change of voltage (line voltage) and change of voltage deviation of each battery unit when the abnormality (stuck open), in which the positive electrode-side contactor is fixed in the open state, occurs in any one of battery units of the power control apparatus according to the embodiment of the present invention.

For example, during traveling of the vehicle, as shown after a time t1 in FIGS. 2 and 3, when an abnormality (stuck open), in which the positive electrode-side contactor 22 is fixed in an open state, occurs in any one of the plurality of (for example, three) battery units 21, voltage (line voltage) of the battery unit 21 corresponding to the positive electrode-side contactor 22 which is stuck open constantly maintains the value at which the abnormality occurs. On the other hand, the voltage (line voltage) of the battery units 21 corresponding to other normal positive electrode-side contactors 22 is decreased according with power supply to a load such as the motor 3 and an air conditioner which are mounted on the vehicle.

Thereby, the voltage deviation between the voltage of the battery unit 21 corresponding to the positive electrode-side contactor 22 which is stuck open and the voltage of the battery units 21 corresponding to other normal positive electrode-side contactors 22 is increased.

In addition, current corresponding to the voltage deviation flows into a closed circuit which is configured of the plurality of battery units 21 mutually connected via the precharge resistor 31, the current flowing to the precharge resistor 31 is increased according with an increase of the voltage deviation, and thus, heat generation of the precharge resistor 31 is increased.

Moreover, for example, at a time t3 shown in FIG. 3, when the voltage deviation reaches the first predetermined threshold (that is, an open failure determination threshold for determining that the cutoff state occurs in a battery unit 21, and for example, a sum of a maximum voltage difference which is generated when the battery unit 21 is self-discharged in a state of being cut off from the load and a detection error of the voltage sensor 24a), the power control apparatus 1 starts time counting of a first failure decision counter.

In addition, for example, at a time t4 shown in FIG. 3, when the voltage deviation is equal to or more than the first predetermined threshold and the count value of the first failure decision counter reaches a predetermined threshold over a certain period (time), the power control apparatus 1 switches a flag value of an open failure decision flag which decides occurrence of the cutoff state in the battery unit 21 from "0" to "1".

Moreover, the power control apparatus 1 notifies the driver of the electrically driven vehicle that the battery unit 21 is in the abnormal state.

In addition, for example, at a time t5 shown in FIG. 3, the voltage deviation reaches the second predetermined threshold (that is, a voltage deviation abnormality determination threshold during the driving for determining that an abnormality may occur in the precharge resistor 31 due to the cutoff state which occurs in any one of battery unit 21, and for example, a value corresponding to the resistance value of the precharge resistor 31 or the current value which is allowed for the precharge resistor 31), the power control apparatus 1 starts time counting of a second failure decision counter.

Moreover, for example, at a time t6 shown in FIG. 3, if the voltage deviation is equal to or more than the second predetermined threshold and the count value of the second failure decision counter reaches a predetermined threshold over a certain period (time), the power control apparatus 1 outputs a vehicle stop request, stops the driving of the motor 3 by the motor ECU 6, and also stops power consumption of other loads such as the air conditioner.

Figure 4:
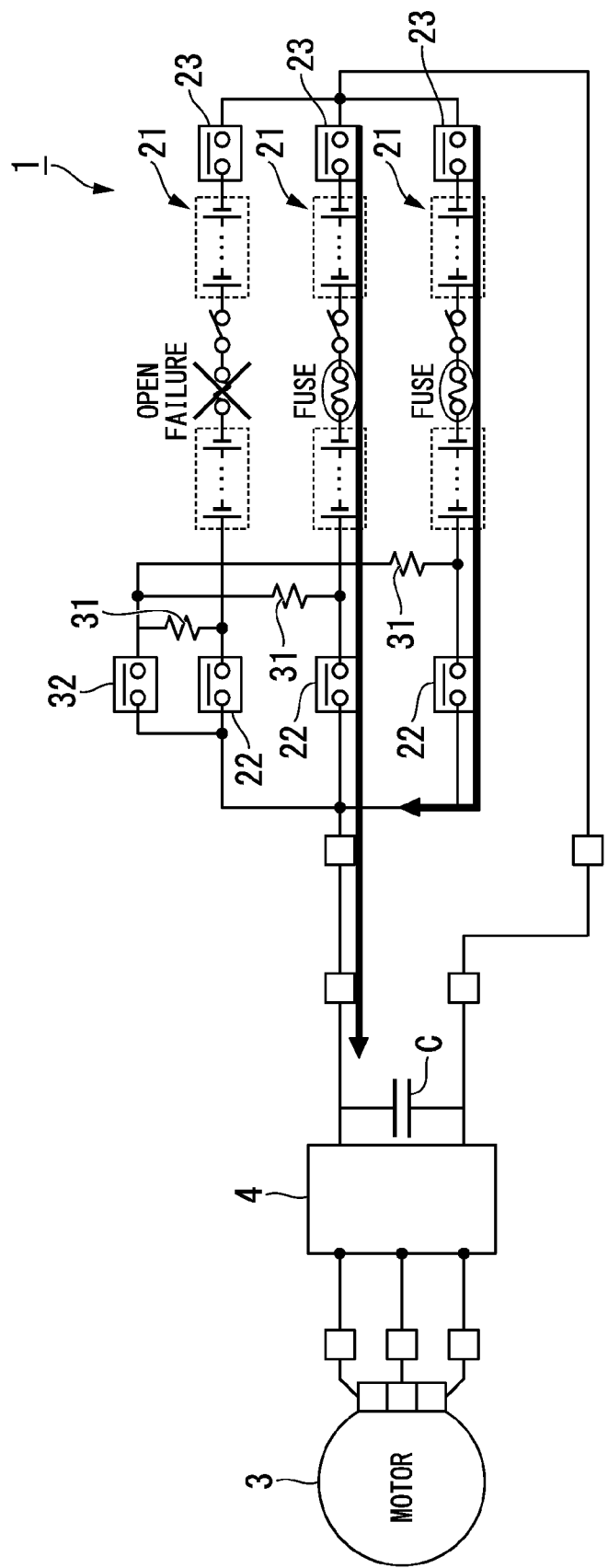
FIG. 4 is a view showing a state where a cutoff state has occurred in any one of battery units of the power control apparatus according to the embodiment of the present invention.

In addition, for example, as shown in FIG. 4, in a case where disconnection, the cutoff in the cutoff mechanism 25 or the like occurs in the battery unit 21, current corresponding to the voltage deviation flows into the closed circuit which is configured of the plurality of battery units 21 mutually connected via the precharge resistor 31 when the cutoff state is cancelled, and the precharge resistor 31 is heated.

Also in this case, when the voltage deviation becomes equal to or more than the first predetermined threshold and the count value of the first failure decision counter reaches a predetermined threshold before the cutoff state is cancelled, the power control apparatus notifies the driver of the electrically driven vehicle that the battery unit 21 is in the abnormal state.

Moreover, when the voltage deviation becomes equal to or more than the second predetermined threshold and the count value of the second failure decision counter reaches a predetermined threshold, the power control apparatus outputs the vehicle stop request, stops the driving of the motor 3 by the motor ECU 6, and also stops power consumption of other loads such as the air conditioner.

As described above, according to the power control apparatus 1 of the present embodiment, when the voltage deviation between the plurality of battery units 21 is equal to or more than the first predetermined threshold, by detecting the presence or absence of the battery unit 21 which comes into the cutoff state among the plurality of battery units 21, it is possible to prevent the voltage deviation from suddenly being larger than the first predetermined threshold, and to early detect a (for example, before the voltage deviation is excessively increased and the electrically driven vehicle cannot be run) presence or absence of the battery unit 21 which has come into the cutoff state.

In addition, notifying the driver of the abnormality of the battery unit 21 makes it possible for the driver to prevent an occurrence of unexpected overheating of the precharge resistor 31 or the battery unit 21. Thereby, it is possible to prevent the electrically driven vehicle from suddenly being unable to run.

Moreover, when the voltage deviation between the plurality of battery units 21 is equal to or more than the second predetermined threshold, the driver can prevent unexpected and sudden drive stop of the load by stopping the driving of the load.

In addition, by making the first predetermined threshold be the sum of the maximum voltage difference which is generated when the battery unit 21 is self-discharged in a state of being cut off from the load and the detection error of the voltage sensor 24a, the voltage deviation due to self-discharge of each battery unit 21 and the voltage deviation due to an abnormality of the battery unit 21 can be appropriately distinguished from each other.

Moreover, by making the second predetermined threshold be a value corresponding to the resistance value of the precharge resistor 31 or the current value which is allowed for the precharge resistor 31, it is possible to prevent excessive current from flowing to each precharge resistor 31 which is connected in series to the battery unit 21, and an overheated state can be prevented. Thereby, it is possible to prevent the electrically driven vehicle from suddenly being unable to run.

REFERENCE SIGNS LIST

1: power control apparatus
2: electrical storage device
3: motor (load, electric motor)
4: inverter
5: battery ECU (voltage detection unit, voltage deviation calculation unit, comparator, cutoff detection unit)
6: motor ECU (drive stop unit)
7: MGECU (notification unit, drive stop unit)
8: notification device (notification unit)
11: power supply unit
21: battery unit (battery)
24a: voltage sensor (voltage detection unit)
31: precharge resistor (resistor)
32: precharge contactor (switch)

The invention claimed is:

1. A power control apparatus mounted on an electrically driven vehicle, said power control apparatus comprising:
   an electrical storage device configured by connecting a plurality of batteries in parallel; and
   an electronic control unit (ECU) connected to the electrical storage device, the ECU configured to:
   detect a voltage of a load and each of the plurality of batteries,
      calculate a voltage deviation between the plurality of batteries based on a voltage detected at a time of driving the load, which is driven by power supplied from the electrical storage device,
      compare the voltage deviation with a first predetermined threshold; and
      detect a presence or an absence of the battery, which comes into a cutoff state in the electrical storage device, when the compared voltage deviation is equal to or more than the first threshold.

2. The power control apparatus according to claim 1, further comprising:
   a notification unit that notifies a driver of the electrically driven vehicle that the electrical storage device is in an abnormal state when the presence of the battery, which comes into the cutoff state, is detected by the ECU.

3. The power control apparatus according to claim 1, further comprising:
   a drive stop unit, wherein
   the ECU is configured to compare the voltage deviation with a second predetermined threshold,
   the drive stop unit is configured to stop driving the load when the ECU determines that the voltage deviation is equal to or more than the second predetermined threshold, and
   the second predetermined threshold is larger than the first predetermined threshold.

4. The power control apparatus according to claim 1,
wherein the first predetermined threshold is a sum of a maximum voltage difference, which is generated when each battery is self-discharged in a state of being cut off from the load, and a detection error of the ECU.

5. The power control apparatus according to claim 1,
wherein the electrical storage device mounted on the electrically driven vehicle is connected to at least a capacitor and an inverter which controls an electric motor, and comprises a switch, that is capable of connecting and disconnecting each battery of the plurality of batteries and the capacitor and that supplies electric charges to the capacitor by connecting each battery and the capacitor at a time of starting of the electric motor, and each of resistors that is connected in series between the switch and each battery, and
wherein the second predetermined threshold is set to a smaller value with a decrease of a resistance value of each resistor or a decrease of a current value which is allowed for each of the resistors.

6. The power control apparatus according to claim 2, further comprising:
a drive stop unit, wherein
the ECU is configured to compare the voltage deviation with a second predetermined threshold,
the drive stop unit is configured to stop driving the load when the ECU determines that the voltage deviation is equal to or more than the second predetermined threshold, and
the second predetermined threshold is larger than the first predetermined threshold.

7. The power control apparatus according to claim 2,
wherein the first predetermined threshold is a sum of a maximum voltage difference, which is generated when each battery is self-discharged in a state of being cut off from the load, and a detection error of the ECU.

8. The power control apparatus according to claim 2,
wherein the electrical storage device mounted on the electrically driven vehicle is connected to at least a capacitor and an inverter which controls an electric motor, and comprises a switch, that is capable of connecting and disconnecting each battery of the plurality of batteries and the capacitor and that supplies electric charges to the capacitor by connecting each battery and the capacitor at a time of starting of the electric motor, and each of resistors that is connected in series between the switch and each battery, and
wherein the second predetermined threshold is set to a smaller value with a decrease of a resistance value of each resistor or a decrease of a current value which is allowed for each of the resistors.

* * * * *